United States Patent [19]

Hendershot

[11] Patent Number: 4,936,334
[45] Date of Patent: Jun. 26, 1990

[54] DIFFERENTIAL PRESSURE SHUTTLE VALVE

[75] Inventor: Jay A. Hendershot, Mishawaka, Ind.

[73] Assignee: Allied-Signal Inc., Morristown, N.J.

[21] Appl. No.: 415,153

[22] Filed: Sep. 29, 1989

[51] Int. Cl.[5] ............................................. F16K 31/22
[52] U.S. Cl. .................................. 137/112; 303/84.1; 303/119
[58] Field of Search ................. 137/112; 303/84.1, 119

[56] References Cited

U.S. PATENT DOCUMENTS

| | | |
|---|---|---|
| 2,161,642 | 6/1939 | Stroup . |
| 2,386,585 | 10/1945 | Blank . |
| 2,654,564 | 10/1953 | Pech . |
| 2,729,226 | 1/1956 | Jones . |
| 2,811,979 | 11/1957 | Presnell . |
| 3,550,966 | 12/1970 | Leiber ................... 303/119 |
| 3,774,976 | 11/1973 | Parsons . |
| 3,806,201 | 4/1974 | Montanari . |
| 4,168,100 | 9/1979 | Yama . |
| 4,187,871 | 2/1980 | Hendrickson . |
| 4,685,749 | 8/1987 | Otsuki ................... 137/112 X |
| 4,736,990 | 4/1988 | Brown et al. . |
| 4,833,620 | 6/1989 | Sypniewski ............ 303/119 X |
| 4,844,119 | 7/1989 | Martinic ................. 303/119 |

Primary Examiner—Robert G. Nilson
Attorney, Agent, or Firm—Larry J. Palguta; Ken C. Decker

[57] ABSTRACT

The differential pressure shuttle valve (10) comprises a stepped bore (14) having enlarged (16) and reduced (18) diameter sections. The reduced diameter section (18) communicates with first (20), second (22), and third (24) openings, and the enlarged diameter section (16) is divided into two chambers (50, 60) by an enlarged end (42) of a valve member (40, 140, 240). The valve member (40, 140, 240) includes a central through passage (48, 148, 248) which communicates with the first chamber (50) between the enlarged end (42) of the valve member (40) and the enlarged diameter section (16) of the stepped bore (14). The second chamber (60) is defined between the enlarged end (42) of the valve member (40) and a shoulder (17) disposed between the enlarged (16) and reduced (18) diameter sections of the bore (14). The second chamber (60) communicates with a fourth opening (70) and includes therein a resilient member (80) which biases the valve member (40, 140, 240) away from the first opening (20). A pressure differential across the valve member (40, 140, 240) causes the valve member (40, 140, 240) to shuttle and compress the resilient member (80) so that a reduced end (44, 144, 244) of the valve member (40, 140, 240) engages an end of the bore (14) or insert (28, 90, 228) such that the first opening (20) is isolated from the second (22) and third (24) openings.

10 Claims, 1 Drawing Sheet

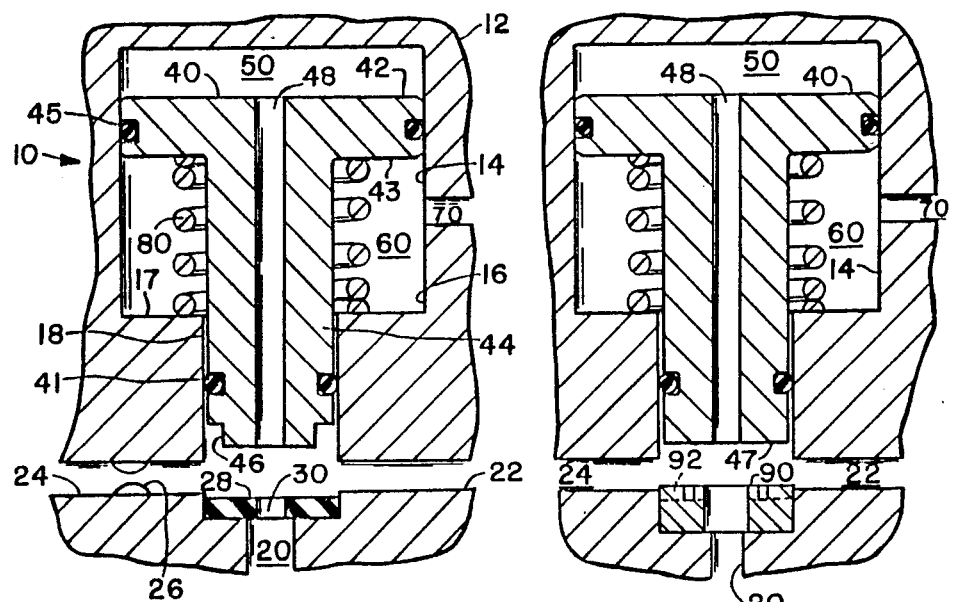
FIG. 1   FIG. 2
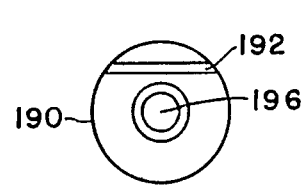   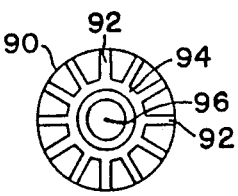
FIG. 4   FIG. 3
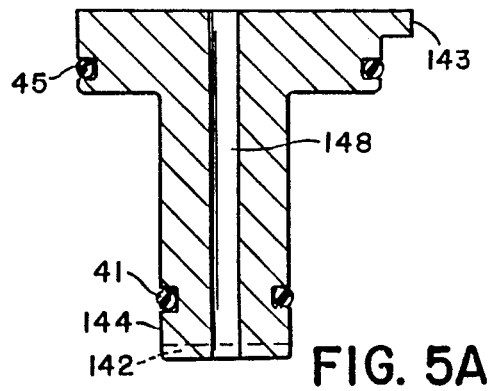   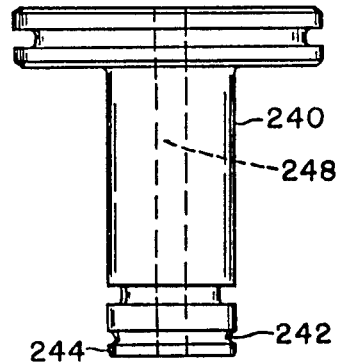
FIG. 5A   FIG. 6A
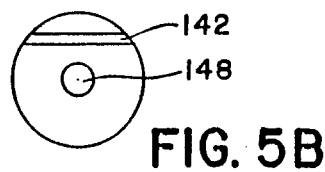   
FIG. 5B   FIG. 6B

DIFFERENTIAL PRESSURE SHUTTLE VALVE

This invention relates generally to a differential pressure shuttle valve, and particularly to a differential pressure shuttle valve that may be utilized in an adaptive braking system.

Many adaptive braking systems have been proposed for use with automotive vehicles. It is desirable in some adaptive braking systems to provide for the isolation of the master cylinder from the hydraulic braking circuit when the adaptive braking system is operative. Such isolation prevents high pressure pulsations within the braking system from being communicated to the master cylinder which would effect feedback via the brake pedal to the vehicle operator. One way of isolating the master cylinder is to use a shuttle valve. It is highly desirable that such shuttle valve be easily manufactured and cost effective in addition to being disposed separate from an associated solenoid valve in the adaptive braking system. It is advantageous for the shuttle valve to be usable on any type of adaptive braking system that utilizes a shuttle build orifice and requires isolation of the master cylinder during adaptive braking.

The present invention provides a differential pressure shuttle valve, comprising a valve body having therein a stepped bore which includes a reduced diameter section and an enlarged diameter section, the reduced diameter section including first, second, and third openings, a valve member disposed in said bore and having reduced and enlarged ends disposed in respective reduced and enlarged diameter sections of the stepped bore, the valve member having a longitudinal passage therethrough, the enlarged end of the valve member engaging sealingly the enlarged diameter section of the bore in order to define both a first chamber between the enlarged end of the valve member and an end of the bore and a second chamber between the enlarged end of the valve member and a bore shoulder portion disposed between the enlarged and small diameter sections of the stepped bore, the second chamber having resilient means therein which biases said valve member away from said reduced diameter section of the stepped bore, and a fourth opening communicating with said second chamber, so that fluid pressure transmitted through said passage to said first chamber effects a pressure differential across said shuttle valve and causes said valve member to move against the biasing force of said resilient means and pressure in the second chamber such that the reduced end of the valve engages an associated end of the bore and isolates said first opening from said second and third openings.

The invention is described in detail below with reference to the drawings which illustrate embodiments in which:

FIG. 1 illustrates the differential pressure shuttle valve of the present invention with an orifice disposed separate from the valve member;

FIG. 2 illustrates an embodiment of the shuttle valve which includes an orificed insert engaged by the shuttle valve;

FIG. 3 is an end view of the orificed insert illustrated in FIG. 2;

FIG. 4 is an alternative embodiment of an orificed insert that may be utilized in FIG. 2;

FIG. 5A is a schematic illustration of a shuttle valve including therein an orifice passageway;

FIG. 5B is an end view of FIG. 5A;

FIG. 6A is another embodiment of a shuttle valve having an annular orifice passage thereabout; and FIG. 6B illustrates an insert that may be utilized with the valve member of FIG. 6A.

FIG. 1 illustrates a differential pressure shuttle valve identified generally by the reference numeral 10. Differential pressure shuttle valve 10 includes a body 12 which includes therein a stepped bore 14. Stepped bore 14 includes an enlarged diameter section 16 and a reduced diameter section 18. Reduced diameter section 18 communicates with a first opening 20 that communicates with a master cylinder (not shown), a second opening 22 which communicates with a build/decay solenoid (not shown) of an adaptive braking system, and a third opening 24 which communicates with an accumulator/pump (not shown) of the adaptive braking system. Opening 24 includes therein an orifice 26. Reduced diameter section 18 further includes a resilient member 28 which has a central opening 30 communicating with first opening 20. Disposed within stepped bore 14 is a valve member 40 which includes an enlarged end 42 and a reduced end 44, and reduced end 44 has a further reduced diameter end section 46. Valve 40 includes a longitudinal through passage 48. Enlarged end 42 defines with enlarged diameter section 16 a first chamber 50, and enlarged end 42 and shoulder 17 disposed between enlarged diameter section 16 and reduced diameter section 18 define a second chamber 60. Second chamber 60 communicates with a fourth opening 70 that transmits fluid pressure present at the associated wheel brake (not shown). Resilient means or spring 80 is disposed in second chamber 60 and is located between shoulder 17 and a shoulder 43 of valve 40 in order to bias valve 40 away from first opening 20. Valve member 40 includes seals 41 and 45 thereabout which engage the walls of stepped bore 14 to effect sealing therebetween.

Shuttle valve 10 illustrated in FIG. 1 operates as follows during normal braking and adaptive braking. Master cylinder pressure is communicated via first opening 20 to the reduced diameter section 18 and via second opening 22 to the associated brake or brakes. The pressure is communicated through central opening 30 of resilient member 28. Master cylinder pressure is also communicated to first chamber 50 via longitudinal through passage 48. The braking pressure received at the brake wheel cylinder (not shown) is communicated back to third chamber 60 via fourth opening 70. Thus, valve member 40 may experience a pressure differential thereacross. The braking pressure received via fourth opening 70, along with the biasing force resilient means 80, acts to keep valve member 40 open during normal or non-adaptive braking.

During a spike apply of the brakes, the pressure surge created by the master cylinder will act on reduced diameter end 44 of valve member 40. The force generated on reduced end 44, the pressure in chamber 60, and the biasing force of spring 80 act against the pressure in chamber 50 to maintain valve member 40 in the open position shown in FIG. 1 and which will allow normal braking to occur.

During adaptive braking, second chamber 60 receives decayed braking pressure via fourth opening 70. At the same time, master cylinder pressure received via first opening 20 is communicated via longitudinal through passage 48 to first chamber 50 and acts on the enlarged end 42 of valve member 40. The difference in brake pressures present within chambers 50 and 60 results in a differential pressure force across valve member 40 which overcomes the biasing force of spring 80 and shuttles the valve member 40 to a closed position wherein reduced diameter end section 46 engages resilient member 28. This isolates first opening 20 from second and third openings 22, 24. Thus, pressure generated by the accumulator/pump of the adaptive braking system and communicated via opening 24 and orifice 26 is transmitted around further reduced diameter end section 46 of valve 40 and to second opening 22. First opening 20 which communicates with the master cylinder is isolated from fluid pressure transmitted via third opening 24. The pressure generated by the accumulator/pump is metered through orifice 26. Upon the release of master cylinder pressure and the cessation of adaptive braking operation, a pressure differential force exerted across enlarged end 42 of valve 40, along with the biasing force of spring 80, causes valve member 40 to return to the open position illustrated in FIG. 1. The pressure differential is created by relieved master cylinder pressure communicated to first chamber 50 and trapped wheel brake cylinder pressure which is communicated to second chamber 60 via fourth opening 70.

FIG. 2 illustrates a further embodiment of the differential pressure shuttle valve of the present invention. The same structure corresponding to the embodiment of FIG. 1 will be identified by the same numbers in FIG. 2. Enlarged diameter section 18 of stepped bore 14 includes an orificed insert 90. Orificed insert 90 (see FIG. 3) includes a plurality of radially extending orifices 92 which communicate with an annular groove 94 disposed about the central opening 96 which communicates with first opening 20. Thus, when valve member 40 moves downwardly as a result of the pressure differential thereacross, valve member end 47 engages the orificed insert and isolates first opening 20 from second and third openings 22, 24. Fluid pressure received via the third opening is communicated to second opening 22 via the radially extending orifices 92 and annular groove 94. The embodiment of FIG. 2 illustrates a means for providing an orificed member which is disposed within the differential pressure shuttle valve stepped bore 14 rather than providing an orifice disposed in connection with third opening 24. The shuttle valve illustrated in FIG. 2 operates the same as the shuttle valve illustrated in FIG. 1. Additionally, the orifices 92, 94 will not experience continuous, blocking by contaminants. When adaptive braking ceases and master cylinder pressure is released so that valve member 40 returns toward an open position as a result of reduced pressure in first chamber 50 and trapped wheel brake cylinder pressure in chamber 60, the pressures at third opening 24 and second opening 22 will relieve, as valve member 40 opens, toward the master cylinder via first opening 20. Fluid flow toward the master cylinder via first opening 20 will act to cleanse the orifice of any contaminants.

FIG. 4 illustrates an alternative form of an orificed insert which may be utilized in the shuttle valve illustrated in FIG. 2. Orificed insert 190 includes a singular orifice passageway 192 which communicates substantially across insert 190 and is spaced radially apart from a central opening 196. More than one orifice passageway 192 can be utilized in insert 190, and a correspondingly shaped and positioned orifice can be disposed in the valve member end 47.

FIGS. 5A and 5B illustrate an alternative shuttle valve 140 which may be utilized as part of the present invention. Instead of providing an orificed insert in the reduced diameter section of the stepped bore, or providing an orifice within the third opening, an orifice can be provided within shuttle valve 140. Shuttle valve 140 includes a reduced section 144 which includes and orifice passageway 142 that extends substantially from one side to the other. As illustrated in the section view of FIG. 5B, orifice passageway 142 is disposed radially apart from longitudinal central passageway 148. In order to ensure that orifice passageway 142 is aligned so that fluid may be communicated between second and third openings 22 and 24, valve member 140 includes a projection 143 which engages a correspondingly shaped side slot (not shown) in stepped bore 14. The engagement of extension 143 with the side slot ensures that valve member 140 is correct oriented so that orifice passageway 142 effects communication between the second and third openings.

FIGS. 6A and 6B illustrate a further embodiment of a shuttle valve 240 which may utilized with the present invention. Shuttle valve 240 includes a central passageway 248 and reduced end 244 includes thereabout an exterior annular orifice groove 242. Exterior annular orifice groove 242 will, when shuttle valve member 240 is in the closed position, permit fluid to be communicated around valve 240 and between the second and third openings. However, orifice groove 242 is of an appropriate size such that fluid flow there about is restricted. A resilient seat member 228 including a central opening 230 is disposed in reduced diameter section 18 of stepped bore 14 so as to be engaged by reduced end 244 of valve 240 when valve 240 is in a closed position.

The pressure differential shuttle valve of the present invention can effectively eliminate a need for an isolation solenoid or check valve in an adaptive braking system. Additionally, the unshuttling of the valve member upon release of master cylinder braking pressure eliminates the need for release check valves which normally relieve wheel cylinder braking pressure. The present invention permits a light spring preload to be utilized because seals 41 and 45 may be friction Teflon () seals as opposed to rubber O-rings and also because the shuttle valve does not shuttle during a spike apply of braking pressure and this alleviates the need for a strong spring force usually required to prevent such shuttling. This result is a more sensitive operation of the valve and protection against unwanted shuttling. The present invention provides a valve which has improved shuttling characteristics and which permits the elimination of other valves from an adaptive braking system, and thereby providing better performance for low cost adaptive braking systems.

I claim:

1. A differential pressure shuttle valve, comprising a valve body having therein a stepped bore which includes a reduced diameter and an enlarged diameter section, the reduced diameter section including first, second, and third openings, a valve member disposed in said bore and having reduced and enlarged ends disposed in respective reduced and enlarged diameter sections of the stepped bore, the valve member having a longitudinal passage therethrough, the enlarged end of the valve member engaging sealingy the enlarged diameter section of the bore in order to define both a first chamber between the enlarged end of the valve member and an end of the bore and a second chamber between the enlarged end of the valve member and a bore shoulder portion disposed between the enlarged and small diameter sections of the stepped bore, the second chamber having resilient means therein which biases said valve member away from said reduced diameter section of stepped bore, and a fourth opening communicating with said second chamber, so that fluid pressure transmitted through said passage to said first chamber effects a pressure differential across said shuttle valve and causes said valve member to move against the biasing force of said resilient means and pressure in the second chamber such that the reduced end of the valve engages an associated end of the bore and isolates said first opening from said second and third openings.

2. The shuttle valve in accordance with claim 1, further comprising orifice means disposed in communication with said third opening so that when said valve member engages the associated end of the stepped bore the first opening experiences said isolation and fluid flow via the third opening to the second opening is restricted by means of the orifice.

3. The shuttle valve in accordance with claim 2, wherein the reduced diameter end of said valve member includes a further reduced diameter end section which permits fluid flow around the valve member and between the third and second openings.

4. The shuttle valve in accordance with claim 3, wherein the reduced diameter section of the bore includes a resilient member at the associated end which is engaged by the valve member to effect sealing therebetween.

5. The shuttle valve in accordance with claim 1, wherein the associated end of the stepped bore includes an orificed insert, the insert having central opening aligned with said passage and laterally extending orifice means so that as said valve member engages said insert, fluid may be communicated between said second and third openings via the orifice means.

6. The shuttle valve in accordance with claim 5, wherein the orifice means comprises a plurality of radially extending passageways which communicate with each other via an annular central groove disposed about the central opening.

7. The shuttle valve in accordance with claim 5, wherein said orifice means comprises orifice passage means extending across the insert and disposed radially spaced apart from the central opening.

8. The shuttle valve in accordance with claim 1, further comprising orifice means disposed at one of the reduced end of the valve member and the associated end of the stepped bore.

9. The shuttle valve in accordance with claim 8, wherein the orifice means is disposed within the reduced end of the valve member, the orifice means extending from one side to the other side of the valve member and spaced radially apart from said passage so that fluid may be communicated between said second and third openings.

10. The shuttle valve in accordance with claim 9, wherein the associated end of the bore includes a resilient seat member, the resilient seat member having a central opening, and the valve member further comprising an exterior annular groove thereabout which, when the reduced end of the valve engages the resilient member, permits fluid communication between the second and third openings.

* * * * *